H. J. JORGENSEN.
SHOCK ABSORBER.
APPLICATION FILED JAN. 16, 1911.
995,874.
Patented June 20, 1911.
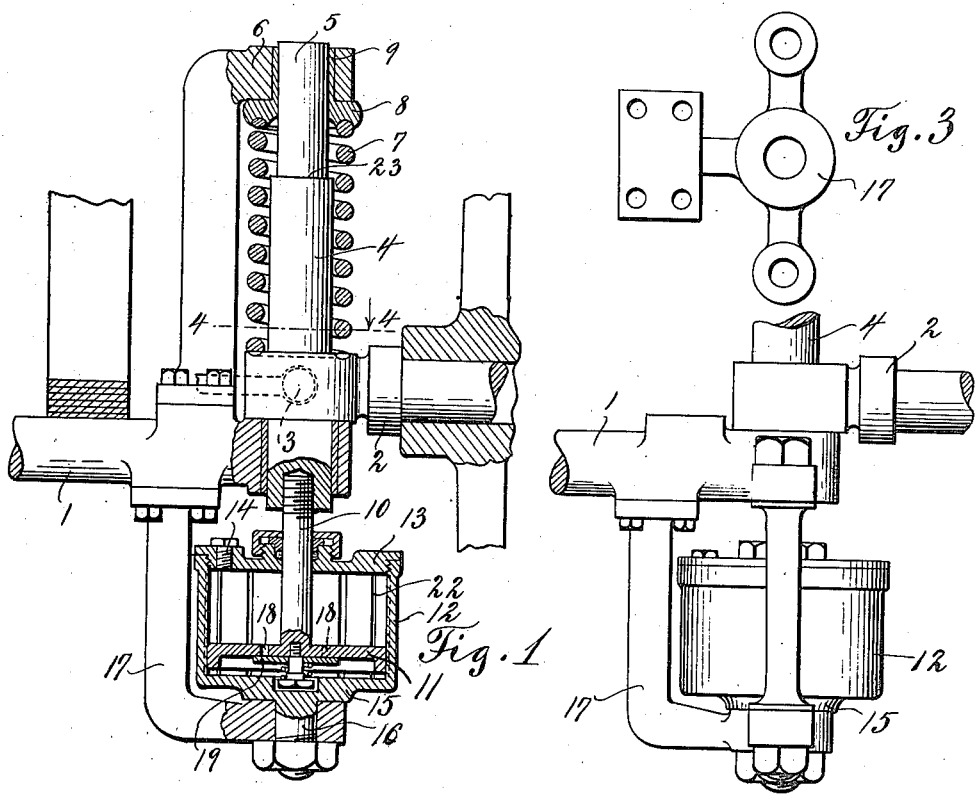
Fig. 1.
Fig. 2.
Fig. 3.
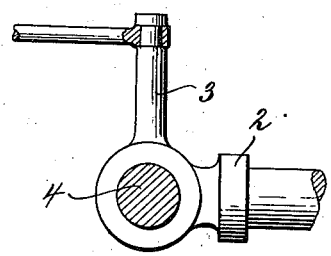
Fig. 4.
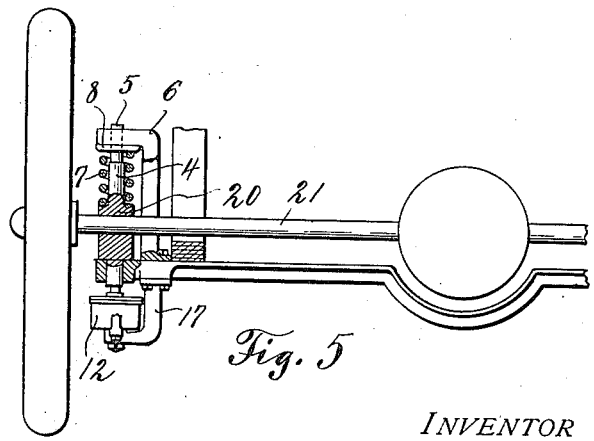
Fig. 5.
WITNESSES:
E. Larson
H. M. Brooks
INVENTOR
H. J. Jorgensen
By Beeler & Robb
Attorneys

UNITED STATES PATENT OFFICE.

HANS J. JORGENSEN, OF CHICAGO, ILLINOIS.

SHOCK-ABSORBER.

995,874. Specification of Letters Patent. Patented June 20, 1911.

Application filed January 16, 1911. Serial No. 602,990.

*To all whom it may concern:*

Be it known that I, HANS JULIUS JORGENSEN, a subject of the King of Denmark, but who have declared my intention of becoming a citizen of the United States, residing at Chicago, in the county of Cook and State of Illinois, have invented certain new and useful Improvements in Shock-Absorbers, of which the following is a specification.

This invention is primarily designed to provide a shock absorber which may be peculiarly mounted to the stub axles of the front automobile wheels whereby less jolting is produced than with devices of the same character now in use.

A further object is to mount the shock absorber to the pivot of the stub axle connection with the main axle whereby the least upward movement of the wheel will carry the shock absorber to its operative position without any apparent movement of the automobile body.

With the above and other objects in view and for a clear understanding of the present invention, reference is to be had to the accompanying drawings, wherein—

Figure 1 is a fragmentary view of a portion of the front shaft of the automobile illustrating clearly the present invention; Fig. 2 is an elevation showing the manner of mounting the dash-pot; Fig. 3 is a plan view illustrating the bracket used for supporting the dash-pot; Fig. 4 is a view taken on line 4—4 of Fig. 1 with certain parts of Fig. 1 omitted; Fig. 5 illustrates the application of the present invention to the rear wheels of an automobile.

Throughout the following detail description and on the several figures of the drawings, similar parts are referred to by like reference characters.

Referring more particularly to the drawings, 1 designates the front main axle of an automobile having the stub axle 2 pivotally secured thereto on which is mounted the wheel. A forwardly extending arm 3 projects from the stub axle 2 to which may be secured any ordinary steering mechanism. The vertical journal member 4, which forms the pivotal connection between the stub axle 2 and the main axle 1, has a vertical extension provided with a reduced portion 5 which is slidably mounted in an opening provided in a bracket 6, said bracket being rigidly carried by the main axle 1. Interposed between the bracket 6 and the stub axle 2 is a coiled spring 7, which spring has its lower bearing on the stub axle 2 and its upper bearing in the seat provided in the enlargement 8 of the bushing 9, which is interposed between the vertical journal member and the bracket 6.

The lower terminal of the vertical journal member 4 is slidably mounted in an opening provided in each terminal of the main axle 1 for that purpose, a bushing being also interposed between the vertical journal member and said main axle. To the lower terminal of the vertical journal member 4 is detachably secured the piston rod 10 which carries on its lower terminal the piston 11 which is adapted to operate in a dash-pot 12, said dash-pot having a movable cover 13. The cover 13 is provided with an opening through which may be injected any desired liquid into the dash-pot 12. This opening may be closed by any desirable means, such as a cap 14, as may readily be observed. Any suitable packing may be provided about the central opening in the cover through which the piston rod 10 operates.

The under surface of the dash-pot is provided with a boss 15 and also a downwardly projecting extension 16 provided at its lower terminal with screw threads. This projection is adapted to be received by an opening provided in a lower bracket 17, which is rigidly secured to the main axle 1. By applying a nut to the threaded portion of the projection 16, after the same is in place, the dash-pot is held in rigid relation to the main axle 1.

The piston 11 is provided with a plurality of openings 18, which are closed by a spring actuated valve 19, as illustrated in Fig. 1.

In applying the device to the rear wheels of an automobile, the vertical journal member is provided with an enlarged central portion 20 in which is provided a horizontal opening or bore through which the pipe 21 carrying the rear axle passes. Aside from this feature, the remaining parts of the shock absorbing device are the same as when applied to the front wheels.

The operation is obvious from the drawing. Upon an upward movement of the wheel, such as is due from a jolt, the vertical journal member 4 which is rigidly or integrally secured to the stub axle 2, as the case may be, also moves upwardly against the tension of the spring 7. The upward movement of the vertical journal member 4 produces a vertical movement of the piston 11 whereby the liquid above said piston passes freely through the openings 18 provided for that purpose, and which are immediately closed by the valve 19 on the downward movement whereby the liquid is forced through vertical grooves 22 provided in the side of the dash-pot for that purpose. It will be evident that the downward movement of the vertical journal member to its normal position is very much slower than the upward movement.

To prevent any accidental displacement of the lower terminal of the vertical journal member 4 from the main axle 1, a shoulder 23 is provided at the junction of said vertical journal member and reduced portion 5, which limits the upward movement by abutting against the bushing.

Having thus fully described my invention, what is claimed as new is:—

In a shock absorber, a main axle, a stub axle, a journal member pivotally connecting said axles, a bracket detachably mounted on said main axle, spring means interposed between said stub axle and said bracket, means carried by said journal member to positively prevent the dislodgment of the stub axle from the main axle, a second bracket detachably carried by said main beam, a dash pot detachably carried by said second bracket, and means operable in said dash pot and detachably secured to said journal member, for the purposes herein specified.

In testimony whereof I affix my signature in presence of two witnesses.

HANS J. JORGENSEN.

Witnesses:
 R. ECENE,
 G. GROUQUIST.